(12) United States Patent
Mizuno

(10) Patent No.: US 8,656,801 B2
(45) Date of Patent: Feb. 25, 2014

(54) DRIVE TRANSMISSION DEVICE AND IMAGE FORMING APPARATUS INCLUDING THE SAME

(75) Inventor: Masahiko Mizuno, Osaka (JP)

(73) Assignee: KYOCERA Document Solutions Inc. (JP)

( * ) Notice: Subject to any disclaimer, the term of this patent is extended or adjusted under 35 U.S.C. 154(b) by 1282 days.

(21) Appl. No.: 12/490,103

(22) Filed: Jun. 23, 2009

(65) Prior Publication Data

US 2010/0077880 A1    Apr. 1, 2010

(30) Foreign Application Priority Data

Oct. 1, 2008 (JP) .................................. 2008-255927

(51) Int. Cl.
*F16H 55/00*    (2006.01)

(52) U.S. Cl.
USPC ........... 74/421 A; 74/414; 74/606 R; 399/107

(58) Field of Classification Search
USPC ..... 74/409, 411, 414, 421 A, 606 R; 399/107
See application file for complete search history.

(56) References Cited

U.S. PATENT DOCUMENTS 5,246,215 A    9/1993    Takamura et al.

FOREIGN PATENT DOCUMENTS

| JP | 53-150359  | 11/1978 |
| JP | 63-119962  | 3/1988  |
| JP | 63-119962  | 8/1988  |
| JP | 2-140059   | 11/1990 |
| JP | 03-020131  | 1/1991  |
| JP | 06-109082  | 4/1994  |
| JP | 08-030061  | 2/1996  |
| JP | 2006-275071| 10/2006 |

*Primary Examiner* — William C Joyce
(74) *Attorney, Agent, or Firm* — McDonnell Boehnen Hulbert & Berghoff LLP

(57) ABSTRACT

A drive transmission device includes a motor pinion gear provided at an output shaft of the driving motor and a-transmission gear engaging the motor pinion gear. In the drive transmission device, a sliding washer and a compression spring are disposed between the transmission-gear and the motor mounting plate. The sliding washer is pressed against a web of the transmission gear by the compression spring.

6 Claims, 7 Drawing Sheets

DRIVE TRANSMISSION DEVICE AND IMAGE FORMING APPARATUS INCLUDING THE SAME

BACKGROUND OF THE INVENTION

1. Field of the Invention

The present invention relates to a drive transmission device that transmits driving power of a driving motor through a motor pinion gear and a gear train including a reduction gear and other gears; and to an image forming apparatus including the drive transmission device.

2. Description of the Related Art

In one example, an image forming apparatus, such as a copying machine or a printer that forms an image onto a sheet by an electrophotography method, is provided with a drive transmission device that transmits driving power of a driving motor to various rollers through a gear train, thereby rotationally driving each roller.

Japanese Unexamined Patent Application Publication No. 2006-275071 (Patent Document 1), disclosing a drive transmission device, proposes a structure in which, in order to increase gear strength and restrict abnormal noise generated when gears contact each other, silicone oil (serving as a lubricant) and amorphous silica (serving as a filler) are added to polyacetal resin (serving as a base material of the gears).

A clearance exists between the inside diameters of gear bosses of the drive transmission device and the rotation sliding bosses that support the gears. Therefore, the orientations of the gears are not stable and adversely affect engagement of the gears. As a result, abnormal noise or vibration is generated.

In related drive transmission devices, the rotation sliding bosses that rotatably support the gears of a gear train are each mounted one-by-one by caulk to a metallic motor mounting plate. As a result, the number of components is increased, and mounting operations require a large number of man-hours and increase costs.

To overcome these problems, the rotation sliding bosses may be integrally formed at a resin housing side. However, when an attempt is made to realize such a structure, a reduction gear and an output shaft (pinion gear) of a motor cannot be positioned with high precision with respect to each other. In addition, the engagement of the gears is adversely affected, thereby generating vibration or abnormal noise as mentioned above.

Accordingly, a first object of the present invention is to provide a drive transmission device that can prevent abnormal noise or vibration from being generated by stabilizing the orientation of the gears, and to provide an image forming apparatus including the drive transmission device.

A second object of the present invention is to provide a drive transmission device that can reduce costs, reduce the number of man-hours, and reduce the number of components by providing rotation sliding bosses, which rotatably support gears, formed integrally with and so as to protrude from a resin member differing from a motor mounting plate; and to provide an image forming apparatus including the drive transmission device.

SUMMARY OF THE INVENTION

According to one aspect of the present invention, there is provided a drive transmission device mounted on a frame. The drive transmission device comprises a motor mounting plate; a driving motor mounted to the frame through the motor mounting plate; a motor pinion gear provided at an output shaft of the driving motor; a transmission gear disposed between the frame and the motor mounting plate and engaged with the motor pinion gear; and a compression spring disposed between the a transmission gear and the motor mounting plate.

According to the drive transmission device, since the reduction gear is stably oriented by being urged in one direction by the compression spring that is interposed between the reduction gear and the motor mounting plate, the transmission gear properly engages with the motor pinion gear, thereby preventing abnormal noise and vibration from being generated when the drive transmission device is operating.

The drive transmission device further comprises a sliding washer pressed against a web of the transmission gear by the compression spring.

Preferably the compression spring is a conical coil spring including a smaller-diameter portion and a greater-diameter portion, the smaller-diameter portion is fitted onto an outer side of a boss of the transmission gear, and the greater-diameter portion is made to contact a surface of the motor mounting plate.

Preferably the frame is a resin frame, and the rotation sliding bosses that rotatably support the transmission gears are provided integrally with the resin frame.

Preferably the motor mounting plate has a positioning hole, and the motor mounting plate is positioned with respect to the frame by fitting the positioning hole to the rotation sliding boss.

According to another aspect of the present invention, there is provided an image forming apparatus comprising a drive transmission device mounted on a frame. The drive transmission device includes a motor mounting plate; a driving motor mounted on the frame through the motor mounting plate; a motor pinion gear provided at an output shaft of the driving motor; a transmission gear disposed between the frame and the motor mounting plate and engaged with the motor pinion gear; and a compression spring disposed between the transmission gear and the motor mounting plate.

As a result, it is possible to provide an image forming apparatus that can prevent abnormal noise and vibration from being generated from the drive transmission device during operation thereof, and whose operating noise is silent.

DESCRIPTION OF THE PREFERRED EMBODIMENTS

An embodiment of the present invention will hereunder be described with reference to the attached drawings.

Figure 1:
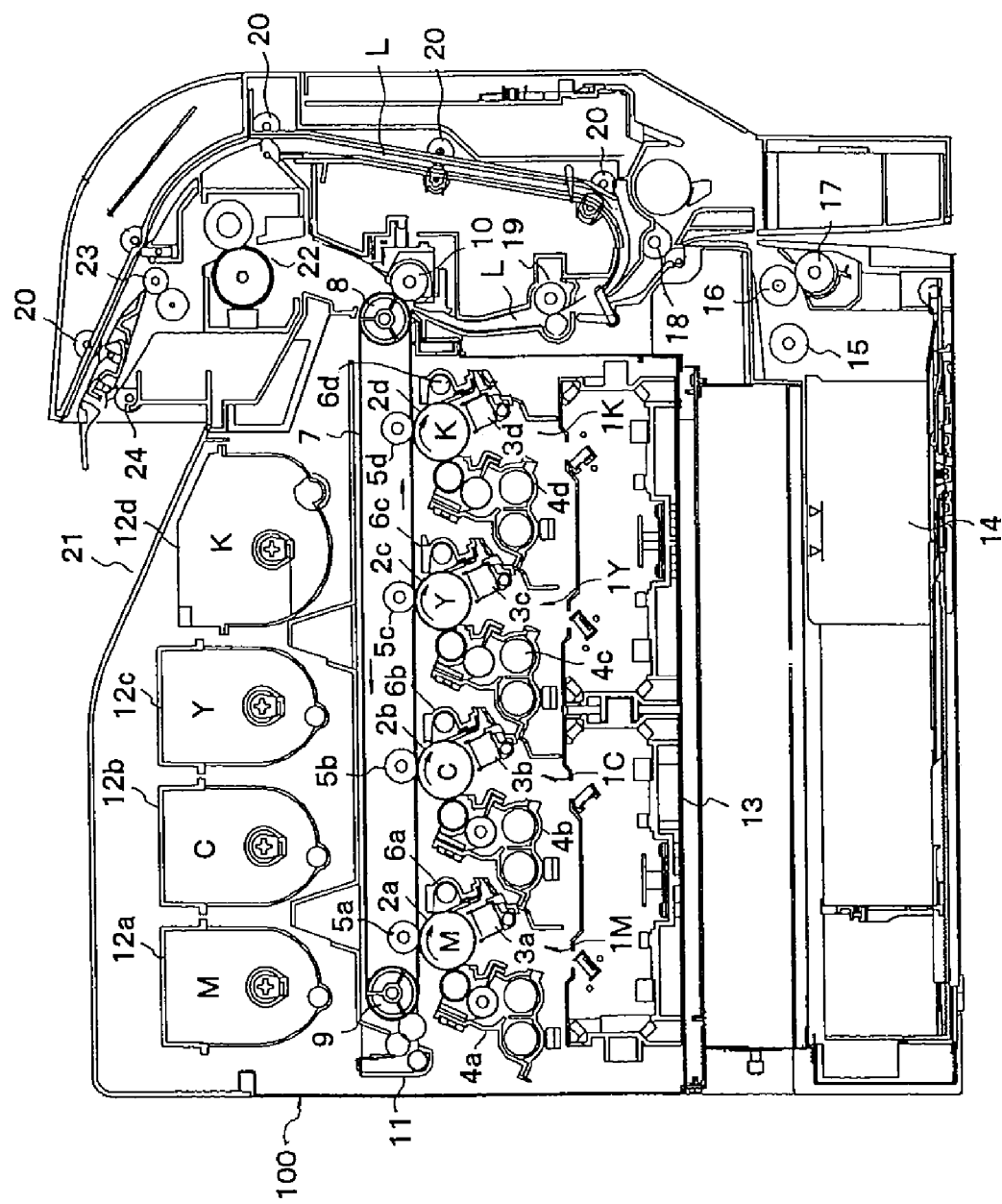
FIG. 1 is a sectional view of an image forming apparatus (color laser printer) according to the present invention.

FIG. 1 is a sectional view of a color laser printer serving as one form of an image forming apparatus according to an embodiment of the present invention. The illustrated color laser printer is a tandem color laser printer. A magenta image forming unit 1M, a cyan image forming unit 1C, a yellow image forming unit 1Y, and a black image forming unit 1K are disposed at intervals in a tandem arrangement at a central portion in an apparatus body 100.

Disposed in the image forming units 1M, 1C, 1Y, and 1K, are photosensitive drums 2a, 2b, 2c, and 2d, charging rollers 3a, 3b, 3c, and 3d, developing devices 4a, 4b, 4c, and 4d, and transfer rollers 5a, 5b, 5c, and 5d. Drum cleaning devices 6a, 6b, 6c, and 6d are disposed around the photosensitive drums 2a to 2d.

Here, the photosensitive drums 2a to 2d are drum-shaped photosensitive members, and are rotationally driven at a predetermined speed in the direction of the arrows (clockwise direction) by a motor (not shown). The charging rollers 3a to 3d uniformly charge the surfaces of the photosensitive drums 2a to 2d to predetermined electric potentials by applying a charging bias applied from a charging bias power supply (not shown).

The developing devices 4a to 4d contain magenta (M) toner, cyan (C) toner, yellow (Y) toner, and black (B) toner, respectively. The developing devices 4a to 4d cause the toners of the respective colors to adhere to electrostatic latent images formed on the respective photosensitive drums 2a to 2d to make visible the electrostatic latent images.

The transfer rollers 5a to 5d are disposed so that they can contact the respective photosensitive drums 2a to 2d through an intermediate transfer belt 7 at respective primary transfer sections. Here, the intermediate transfer belt 7 is provided in a tensioned state between a secondary transfer opposing roller 8 and a tension roller 9, and is disposed so that it runs above the photosensitive drums 2a to 2d. The secondary transfer opposing roller 8 is disposed so that it contacts a second transfer roller 10 through the intermediate transfer belt 7 at a secondary transfer location. In addition, a belt cleaning device 11 is provided near the tension roller 9.

Toner containers 12a, 12b, 12c, and 12d for replenishing the respective developing devices 4a to 4d with toner are disposed in a row above the respective image forming units 1M, 1C, 1Y, and 1BK in the apparatus body 100.

A laser scanner unit (LSU) 13 is disposed below the image forming units 1M, 1C, 1Y, and 1BK in the apparatus body 100. A sheet-feed cassette 14 is removably disposed at the bottom portion of the body 100 so as to be situated below the LSU 13. The sheet-feed cassette 14 holds a plurality of stacked sheets (not shown). A pickup roller 15 that picks out the sheets from the sheet-feed cassette 14 one at a time, and a feed roller 16 and retard roller 17 that send the picked-out sheet to a conveying path L, are provided near the sheet-feed cassette 14.

A pair of conveying rollers 18 that convey a sheet and a pair of registration rollers 19 that supply a sheet to the secondary transfer section (which is a contact portion of the secondary transfer opposing roller 8 and the secondary transfer roller 10) at a predetermined timing after the sheet is temporarily set in a standby state are provided along the conveying path L extending vertically along a side portion of the apparatus body 100. A different conveying path L' used when forming images on both sides of a sheet is formed beside the conveying path L. A plurality of pairs of switch-back rollers 20 are provided at proper intervals along the conveying path L'.

The conveying path L, disposed vertically at one side portion in the apparatus body 100, extends up to a sheet-discharge tray 21 provided at the upper surface of the apparatus body 100. A thermal fixing device 22, a pair of conveying rollers 23, and a pair of sheet-discharge rollers 24 are provided along the conveying path L.

Next, the operation of forming an image by the color laser printer having the above-described structure will be described.

When an image formation start signal is generated, the photosensitive drums 2a to 2d in the respective image forming units 1M, 1C, 1Y, and 1BK are rotationally driven at a predetermined process speed in the direction of arrows shown in FIG. 1 (that is, in a clockwise direction), and the photosensitive drums 2a to 2d are uniformly charged by the respective charging rollers 3a to 3d. The laser scanner unit 13 emits laser beams modulated on the basis of color image signals of the respective colors to irradiate the surfaces of the photosensitive drums 2a to 2d with the modulated laser beams, thereby forming electrostatic latent images corresponding to the color image signals of the respective colors on the respective photosensitive drums 2a to 2d.

First, the developing device 4a, to which a developing bias voltage having a same polarity as charging polarity of the photosensitive drum 2a is applied, causes magenta toner to translate to the electrostatic latent image formed on the photosensitive drum 2a of the magenta image forming unit 1M, so that the electrostatic latent image is made visible as a magenta toner image. At the primary transfer section (transfer nip section) between the photosensitive drum 2a and the transfer roller 5a, the transfer roller 5a, to which a primary transfer bias voltage having a reverse polarity as the toner is applied, performs primary transfer of the magenta toner image on the intermediate transfer belt 7.

In this way, the intermediate transfer belt 7 on which the primary transfer of the magenta toner image is performed is moved to the next cyan image forming unit 1C. Similar to the process set forth above, at the cyan image forming unit 1C a cyan toner image formed on the photosensitive drum 2b is superimposed upon and transferred to the magenta toner image provided on the intermediate transfer belt 7 at the primary transfer section.

Similarly, a yellow toner image formed on the photosensitive drum 2c of the yellow image forming unit 1Y and a black toner image formed on the photosensitive drum 2d of the black image forming unit 1BK are successively superimposed upon the previous color toner images formed on the intermediate transfer belt 7 at their respective primary transfer sections. As a result, a full-color toner image is formed on the intermediate transfer belt 7. Residual transfer toners that are not transferred to the intermediate transfer belt 7 and, thus, remain on the respective photosensitive drums 2a to 2d, are then removed by their respective drum cleaning devices 6a to 6d to prepare the photosensitive drums 2a to 2d for the next image forming operation.

Next, in accordance with a timing in which a lead edge of the full-color toner image on the intermediate transfer belt 7 reaches the secondary transfer section (transfer nip portion) between the secondary transfer opposing roller 8 and the secondary transfer roller 10, a sheet fed out to the conveying path L from the sheet-feed cassette 14 by the pickup roller 15, the feed roller 16, and the retard roller 17 is conveyed to the secondary transfer section by the pair of registration rollers 19. Then, the secondary transfer roller 10, to which secondary transfer bias voltage having a polarity that is opposite to that of the toner is applied, performs secondary transfer of the entire full-color toner image to transfer the toner image from the intermediate transfer belt 7 to the sheet conveyed to the secondary transfer section.

The sheet on which the full-color toner image is transferred is conveyed to the thermal fixing device 22 where the full-color toner image is thermally fixed to the surface of the sheet by the application of heat and pressure. The sheet to which the toner image is fixed is then discharged to the sheet-discharge tray 21 by the pair of conveying rollers 23 and the pair of sheet-discharge rollers 24, thereby completing the image forming operations. Residual transfer toners that are not transferred onto the sheet, and thus remain on the intermediate transfer belt 7, are removed by the belt cleaning device 11 to prepare the intermediate transfer belt 7 for the next image forming operation.

The operations above are described for the case in which an image is formed on one side of a sheet. When images are formed on both sides of a sheet, the conveying path is switched by a flapper (not shown) to discharge the sheet having an image already formed on one side thereof by the above-described process to the outside of the apparatus body 100 from an exit of the conveying path L'. Thereafter, the sheet is switched back and drawn into the conveying path L having the front and back sides of the sheet reversed. The sheet having its front and back sides reversed is then conveyed to the pair of registration rollers 19 by the pairs of switch-back rollers 20. Then, a process that is similar to the above-described process is carried out to form an image on the opposite side of the sheet.

Next, a drive transmission device according to the present invention will be described with reference to FIGS. 2 to 7.

Figure 2:
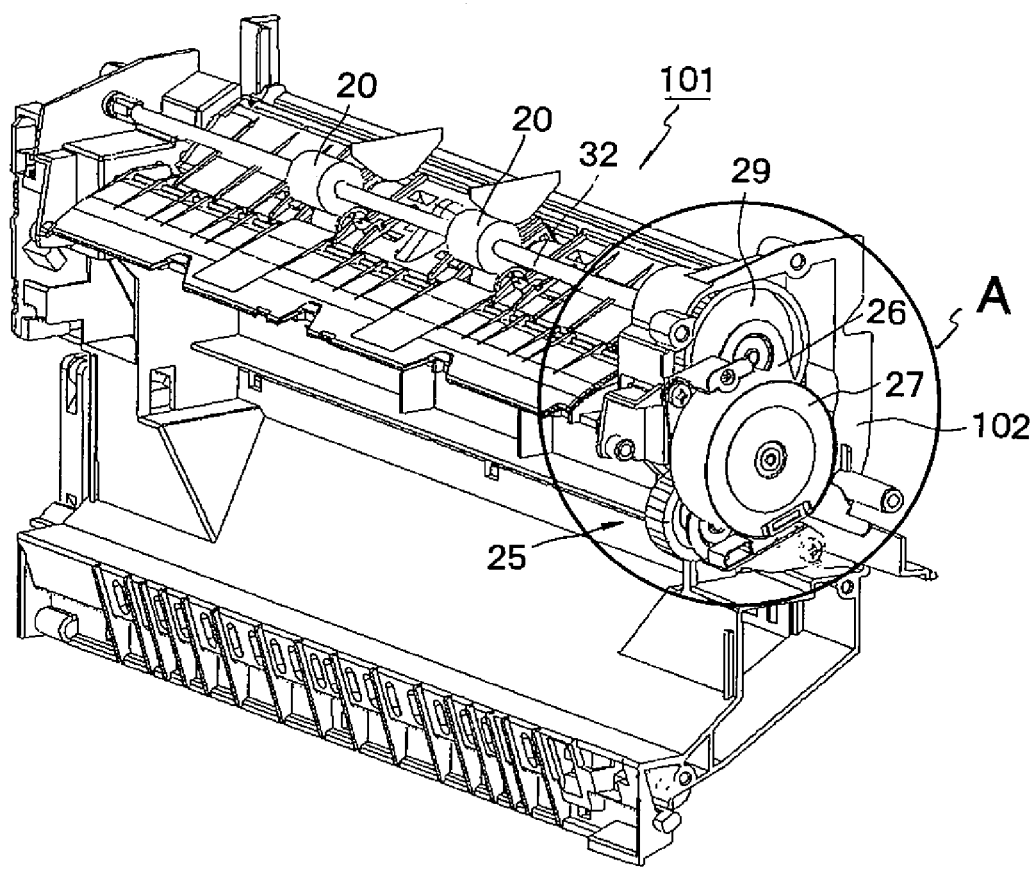
FIG. 2 is a perspective view of a sheet-discharge section of a drive transmission device according to the present invention.
Figure 3:
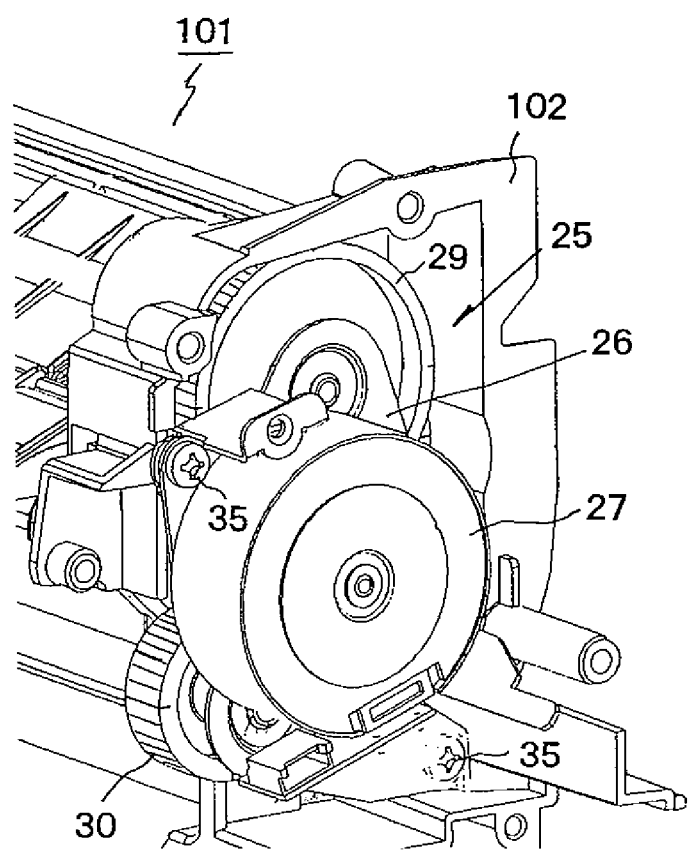
FIG. 3 is an enlarged detailed view of a portion A in FIG. 2.
Figure 4:
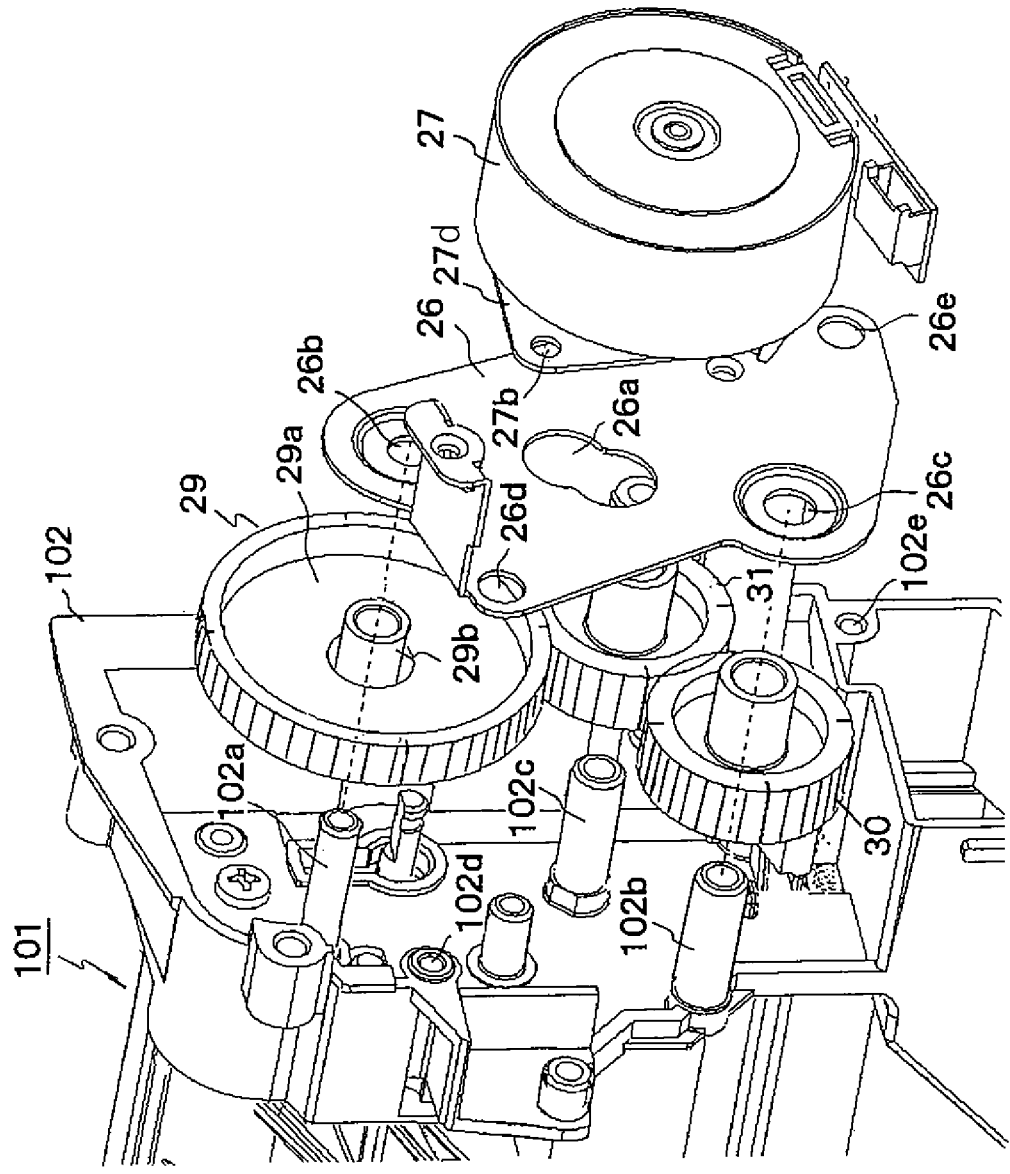
FIG. 4 is an exploded perspective view of the drive transmission device according to the present invention.
Figure 5:
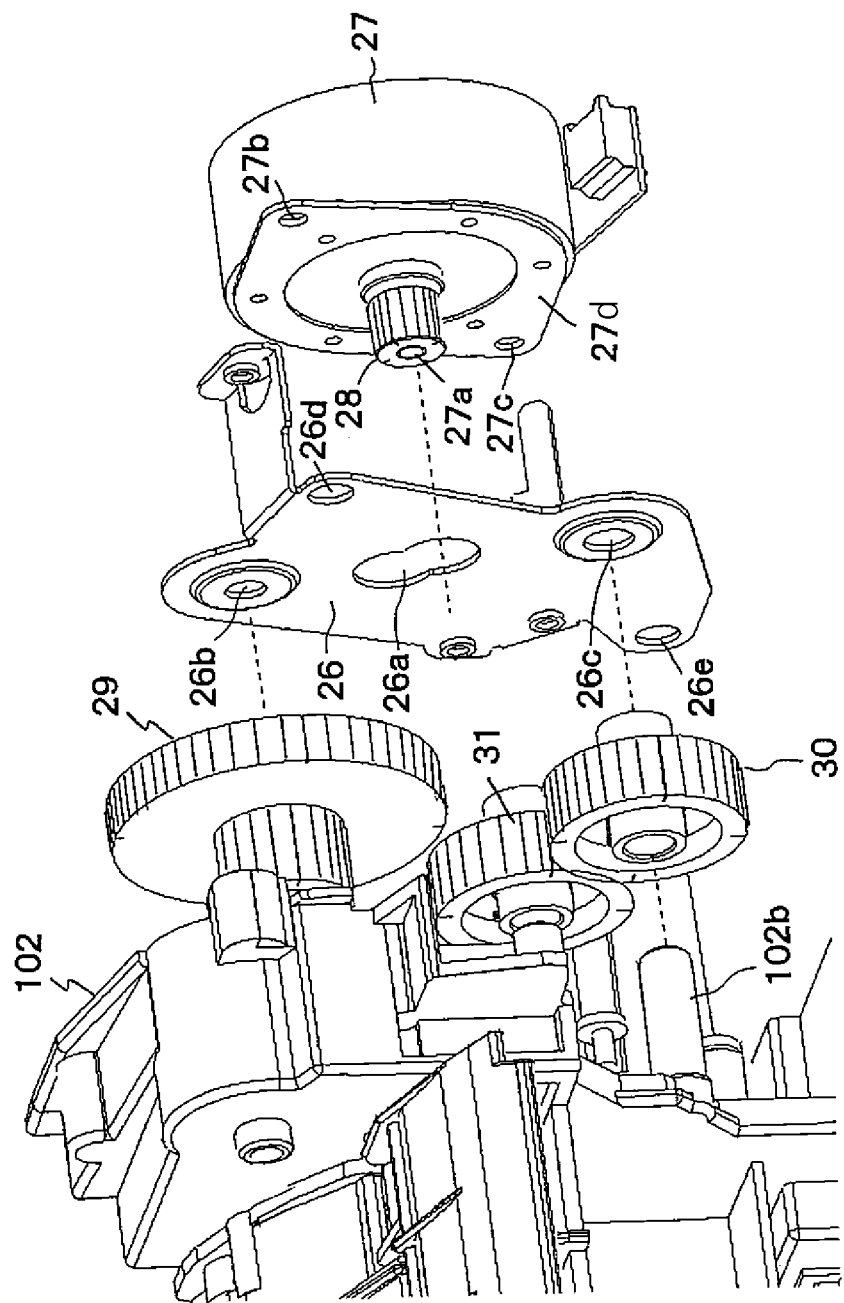
FIG. 5 is an exploded perspective view of the drive transmission device according to the present invention.
Figure 6:
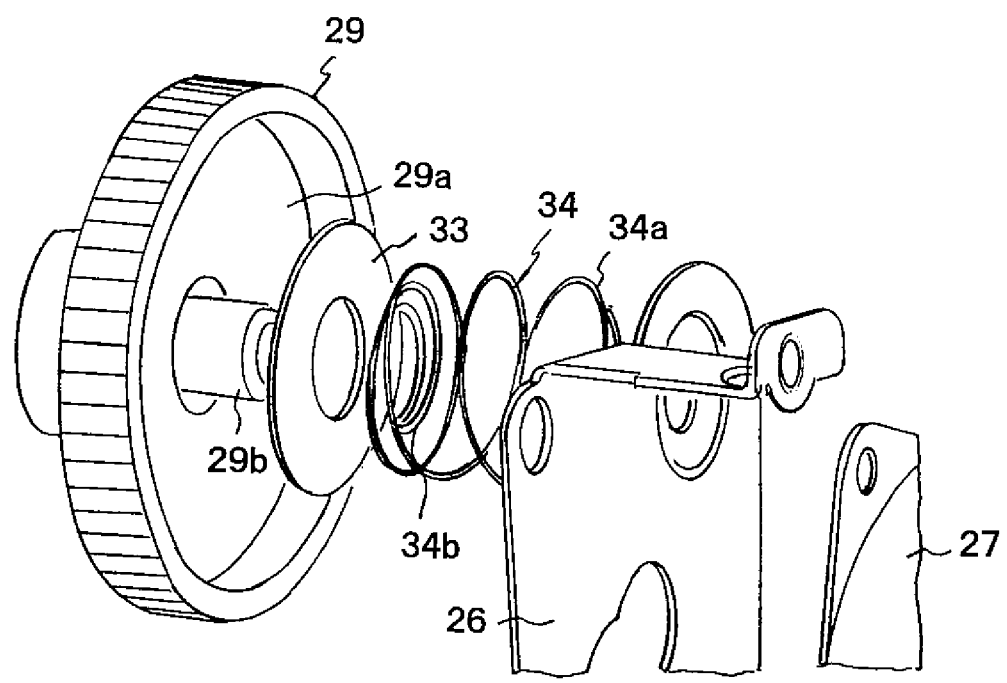
FIG. 6 is an exploded perspective view of a reduction gear of the drive transmission device according to the present invention.
Figure 7:
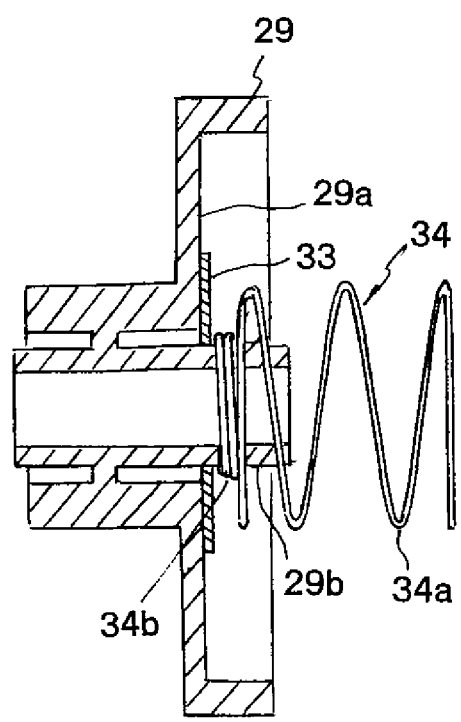
FIG. 7 is a side sectional view of the reduction gear of the drive transmission device according to the present invention.

FIG. 2 is a perspective view of a sheet-discharge section having the drive transmission device according to an embodiment of the present invention. FIG. 3 is an enlarged detailed view of a portion A in FIG. 2. FIGS. 4 and 5 are each an exploded perspective view of the drive transmission device. FIG. 6 is an exploded perspective view of a reduction gear of the drive transmission device. FIG. 7 is a side sectional view of the reduction gear.

As shown in FIG. 2, the sheet-discharge section having, for example, the pairs of switch-back rollers 20 disposed thereat is formed as a sheet-discharge unit 101. A drive transmission device 25 according to an embodiment of the present invention is disposed at one side portion of the sheet-discharge unit 101. The drive transmission device 25 includes a driving motor 27 mounted on a motor mounting plate 26 made of metal, a motor pinion gear 28 provided at an output shaft 27a of the driving motor 27 (as shown in FIG. 5), and a gear train including a reduction gear 29 which engages with the motor pinion gear 28 and other gears 30 and 31. The reduction gear 29 is coupled to a roller shaft 32, supporting the switch-back rollers 20, through a gear (not shown). Discharge rollers 24 are provided with a driving power from the thermal fixing device 22 through the gear 30 and the gear 31. The gear 31 is coupled to a shaft of the discharge rollers (not shown).

As shown in FIGS. 4 and 5, a non-circular through hole 26a for passing the motor pinion gear 28 therethrough is formed in the central portion of the motor mounting plate 26; circular positioning holes 26b and 26c are formed at diagonally offset positions; and circular screw through holes 26d and 26e are formed at diagonally offset positions that are opposite to those of the circular positioning holes 26b and 26c. In addition, screw through holes 27b and 27c are formed at diagonally offset positions of a motor flange 27d of the driving motor 27.

As shown in FIG. 4, circular cylindrical rotation sliding bosses 102a, 102b, and 102c, which rotatably support the reduction (transmission) gear 29 and the gears 30 and 31, respectively, are integrally provided with an end face of a frame 102 (which is a resin member of the sheet-discharge unit 101) at a side where the drive transmission device 25 is provided, and protrude outwardly from the frame. Threaded holes 102d and 102e are formed in the frame 102.

As shown in FIGS. 6 and 7, in the drive transmission device 25 according to an embodiment of the present invention, a compression spring 34 and a sliding washer 33 made of resin, are interposed between the reduction gear 29 and the motor mounting plate 26. Here, the compression spring 34 is a conical coil spring having different diameters including a greater-diameter portion 34a and a smaller-diameter portion 34b. The sliding washer 33 is pressed against a web 29a of the reduction (transmission) gear 29 by the compression spring 34.

In mounting the drive transmission device 25, the reduction gear 29 and the gears 30 and 31 are respectively inserted onto and rotatably supported by the rotation sliding bosses 102a, 102b, and 102c protruding from the frame 102 of the sheet-discharge unit 101. The motor mounting plate 26 is attached by fitting the rotation sliding bosses 102a and 102b (protruding from the frame 102) to the positioning holes 26b and 26c of the motor mounting plate 26. Screws 35 (see FIG. 3), which are inserted into the screw through holes 27b and 27c of the motor flange 27d of the driving motor 27 and into the screw through holes 26d and 26e of the motor mounting plate 26, are screwed into the threaded holes 102d and 102e (see FIG. 4) of the frame 102, so that the motor mounting plate 26 is, along with the driving motor 27, mounted to the frame 102.

In the drive transmission device 25 having the above-described structure, the orientation of the reduction (transmission) gear 29 is stabilized by urging the reduction (transmission) gear 29 in one direction by the compression spring interposed between the reduction (transmission) gear 29 and the motor mounting plate 26. Therefore, the reduction (transmission) gear 29 properly engages with the motor pinion gear 28 (not shown), preventing abnormal noise or vibration from being generated during operation.

Since the sliding washer 33 is pressed against the web 29a of the reduction (transmission) gear 29 by the compression spring 33, an end of the compression spring 34 does not get caught by the reduction (transmission) gear 29. As a result it does not prevent the reduction (transmission) gear 29 from rotating or cause damage to the reduction (transmission) gear 29.

Further, since the compression spring 34 is a conical coil spring having different diameters, the smaller-diameter portion 34b is fitted to the outer periphery of the boss 29b of the reduction (transmission) gear 29 and functions as a positioning portion. After incorporating the compressing spring 34, the greater-diameter portion 34a contacts a surface of the motor mounting plate 26 to stabilize the orientation of the compression spring 34 and to reduce a contact pressure of the compression spring 34 with respect to the sliding washer 33.

Since the rotation sliding bosses 102a, 102b, and 102c, which rotatably support the reduction (transmission) gear 29 and the gears 30 and 31, integrally protrude from the frame 102, made of resin, which is different from the motor mounting plate 26, it is possible to reduce the number of parts, the number of man-hours, and costs.

In the embodiment, since the motor mounting plate 26 is positioned by making use of the existing rotation sliding bosses 102a and 102b, it is not necessary to separately provide positioning bosses, so that the positioning structure can be simplified.

Although, in particular, a form in which an embodiment of the present invention is applied to the color laser printer and the drive transmission device located at the sheet-discharge section thereof is described, the present invention is not limited thereto. That is, it is obvious that the present invention is similarly applicable to a monochromatic image forming apparatus and to a drive transmission device provided therein. In addition, the present invention is applicable to a drive transmission device located at a portion other than the sheet-discharge section of the image forming apparatus.

What is claimed is:

1. A drive transmission device mounted on a frame and comprising:
    a motor mounting plate;
    a driving motor coupled to the frame through the motor mounting plate;
    a motor pinion gear provided at an output shaft of the driving motor;
    a transmission gear located between the frame and the motor mounting plate and engaged with the motor pinion gear; and
    a compression spring disposed between the transmission gear and the motor mounting plate,
    wherein the frame is comprised of resin, and wherein a rotation sliding boss that rotatably supports the transmission gear is formed integrally with the frame, and
    wherein the motor mounting plate has a positioning hole, and the motor mounting plate is positioned with respect to the frame by fitting the positioning hole to the rotation sliding boss.

2. The drive transmission device according to claim 1, further comprising:
    a sliding washer disposed between the transmission gear and the compression spring and being pressed against a web of the transmission gear by the compression spring.

3. The drive transmission device according to claim 1, wherein the compression spring is a conical coil spring including a smaller-diameter portion and a greater-diameter portion, and wherein the smaller-diameter portion is fitted onto an outer side of a boss of the transmission gear, and the greater-diameter portion is made to contact a surface of the motor mounting plate.

4. An image forming apparatus comprising:
    a drive transmission device mounted on a frame, the drive transmission device including:
    a motor mounting plate;
    a driving motor coupled to the frame through the motor mounting plate;
    a motor pinion gear provided at an output shaft of the driving motor;
    a transmission gear disposed between the frame and the motor mounting plate and engaged with the motor pinion gear;
    and
    a compression spring disposed between the transmission gear and the motor mounting plate,
    wherein the frame is comprised of resin, and wherein a rotation sliding boss that rotatably supports the transmission gear is formed integrally with the frame, and
    wherein the motor mounting plate has a positioning hole, and the motor mounting plate is positioned with respect to the frame by fitting the positioning hole to the rotation sliding boss.

5. The image forming apparatus according to claim 4, further comprising:
    a sliding washer disposed between the transmission gear and the compression spring and being pressed against a web of the transmission gear by the compression spring.

6. The image forming apparatus according to claim 4, wherein the compression spring is a conical coil spring including a smaller-diameter portion and a greater-diameter portion, wherein the smaller-diameter portion is fitted onto an outer side of a boss of the transmission gear, and the greater-diameter portion is made to contact a surface of the motor mounting plate.

* * * * *